(12) United States Patent
Jalali

(10) Patent No.: US 9,997,091 B2
(45) Date of Patent: Jun. 12, 2018

(54) APPARATUS AND METHOD FOR LOCAL ADVERTISING

(71) Applicant: Alireza Jalali, Naperville, IL (US)

(72) Inventor: Alireza Jalali, Naperville, IL (US)

(73) Assignee: Alireza Jalali, Naperville, IL (US)

(*) Notice: Subject to any disclaimer, the term of this patent is extended or adjusted under 35 U.S.C. 154(b) by 0 days. days.

(21) Appl. No.: 15/202,331

(22) Filed: Jul. 5, 2016

(65) Prior Publication Data
US 2018/0012524 A1 Jan. 11, 2018

(51) Int. Cl.
*G09F 3/20* (2006.01)
*B65G 9/00* (2006.01)

(52) U.S. Cl.
CPC ............ *G09F 3/201* (2013.01); *B65G 9/002* (2013.01); *B65G 2201/0229* (2013.01); *B65G 2207/04* (2013.01)

(58) Field of Classification Search
CPC . G09F 3/201; B65G 9/002; B65G 2201/0229; B65G 2207/04
See application file for complete search history.

(56) References Cited

U.S. PATENT DOCUMENTS

| | | | | |
|---|---|---|---|---|
| 3,010,584 A | * | 11/1961 | Rutkovsky | B65G 17/20 198/678.1 |
| 3,184,042 A | * | 5/1965 | Rutkovsky | B65G 17/20 198/367 |
| 3,283,914 A | * | 11/1966 | Robinson | B65G 9/002 211/1.57 |
| 3,587,473 A | * | 6/1971 | Weiss et al. | B65G 9/002 104/89 |
| 5,427,227 A | | 6/1995 | Crandall et al. | |
| 5,515,632 A | * | 5/1996 | Gebka | G09F 3/204 40/649 |
| 5,524,948 A | | 6/1996 | Bostwick | |
| 6,186,314 B1 | | 2/2001 | Conklin, Jr. | |
| 6,330,969 B1 | | 12/2001 | Villaraut | |
| 6,823,236 B2 | | 11/2004 | Speckhart et al. | |
| 6,942,111 B2 | * | 9/2005 | Harrell | B65G 9/002 211/113 |
| 6,971,504 B2 | | 12/2005 | Molinaro | |
| 7,245,988 B1 | | 7/2007 | Terepka | |
| 7,277,773 B2 | | 10/2007 | Speckhart et al. | |

(Continued)

FOREIGN PATENT DOCUMENTS

| | | |
|---|---|---|
| JP | 11305708 A | 11/1999 |
| WO | 2006064486 A2 | 6/2006 |

*Primary Examiner* — Gary C Hoge
(74) *Attorney, Agent, or Firm* — Miller, Matthias & Hull LLP

(57) ABSTRACT

A media holder for a dry cleaning conveyor which may include a plurality of interconnected links. The media holder may be attached to one of the plurality of interconnected links and the media holder may include a continuous display portion which is adapted to removably receive and display a media. The media holder may further include a base portion that is attached to the continuous display portion and a connector portion that is configured to attach to the media holder to one of the plurality of interconnected links such that the base portion and the continuous display portion are orientated to display the media in a viewable position and allow unimpeded movement of the dry cleaning conveyor during operation.

20 Claims, 8 Drawing Sheets

(56) References Cited

U.S. PATENT DOCUMENTS

| | | | |
|---|---|---|---|
| 7,404,480 B2* | 7/2008 | Santicchi | B65G 17/20 198/465.4 |
| 8,011,126 B2* | 9/2011 | Nunez | G09F 3/204 40/658 |
| 8,387,745 B2 | 3/2013 | Gross | |
| 9,038,300 B2* | 5/2015 | Theisen | G09F 3/204 40/658 |
| 9,290,326 B2* | 3/2016 | Santicchi | B65G 17/20 |
| 2003/0097201 A1 | 5/2003 | Min | |
| 2006/0130376 A1 | 6/2006 | Vazquez Coria | |
| 2007/0261997 A1 | 11/2007 | Cassady | |
| 2008/0230351 A1 | 9/2008 | Taylor | |
| 2008/0256771 A1 | 10/2008 | Spoors | |
| 2009/0302105 A1 | 12/2009 | Cassady | |
| 2010/0005003 A1 | 1/2010 | Cassady | |
| 2010/0032539 A1 | 2/2010 | Roesler | |
| 2012/0173014 A1 | 7/2012 | Morishita et al. | |
| 2014/0222195 A1 | 8/2014 | Bruck | |
| 2015/0101225 A1 | 4/2015 | Jones | |

* cited by examiner

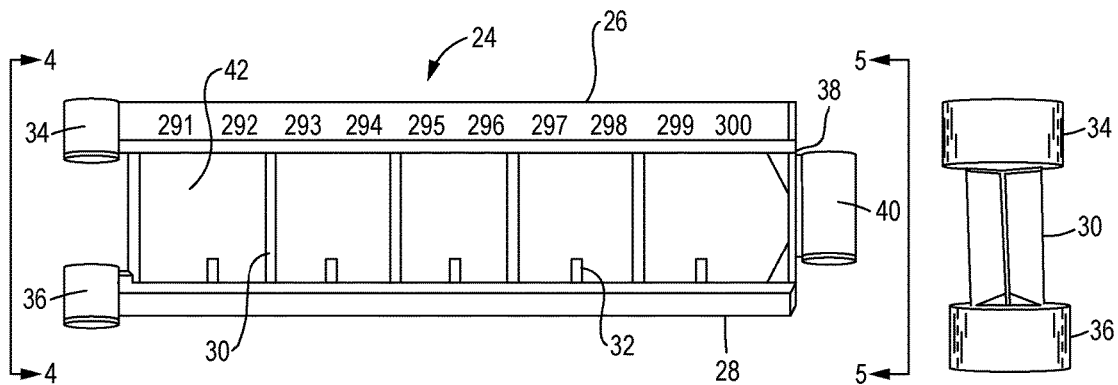
FIG. 2
FIG. 4
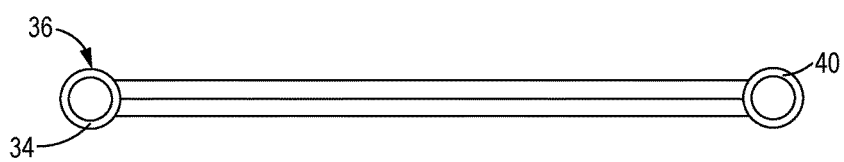
FIG. 3
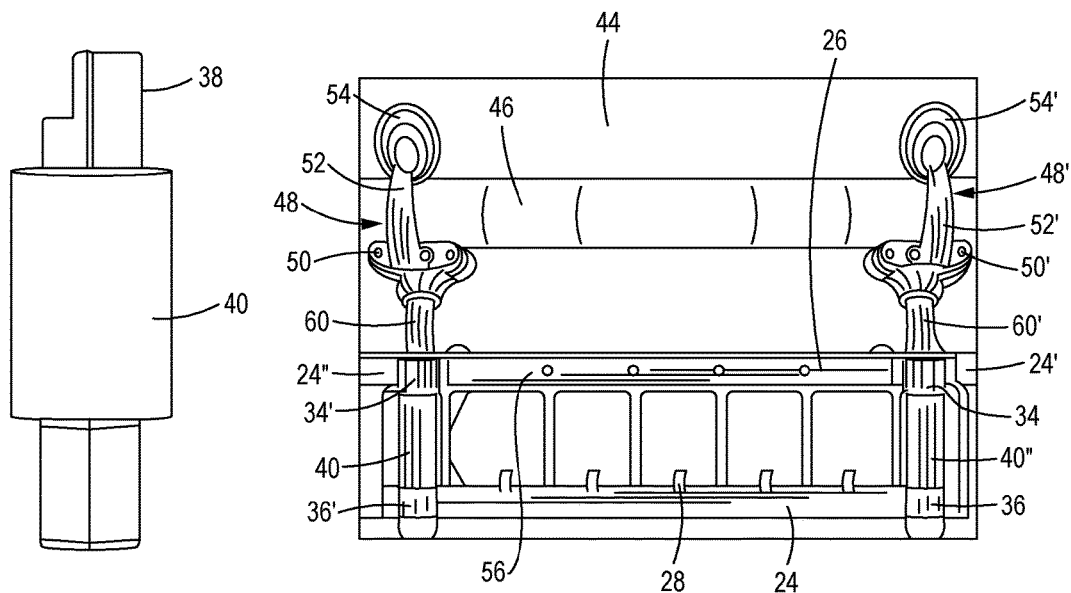
FIG. 5
FIG. 6

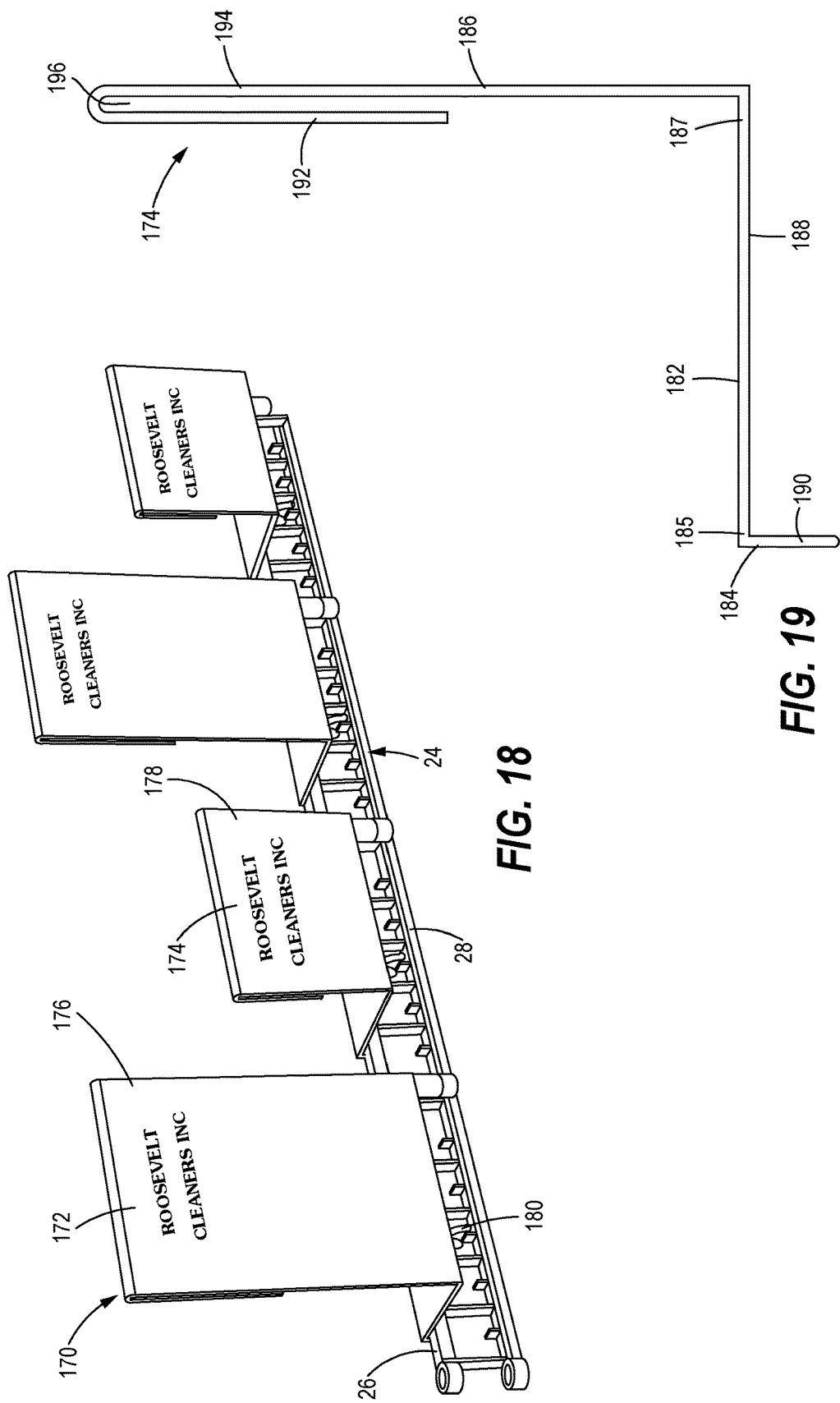

APPARATUS AND METHOD FOR LOCAL ADVERTISING

Described herein is an apparatus and method for targeted, local advertising and, in particular, an advertising display attachable to or formed as a part of individual links of a material handling conveyor such as found in a dry cleaning establishment. Means are provided to quickly insert and remove custom advertising media to provide a continuous display of advertising when the conveyor is in motion and when it is halted. A preferred use of the apparatus is to display information about local businesses and events on individual links of such a conveyor to customers in the shop. Local merchants can post information as to sales, new services, events and other information of interest to a local customer.

BACKGROUND OF THE INVENTION

Advertising is important to all businesses but presents unique problems for the owners of small or local establishments. Media advertising is expensive and must compete for attention with the ads of others, most of whom are likely not local, and requires a potential customer to be watching television or reading internet programming to become aware of the ad. Likewise, print advertising requires a potential customer to read the ad in order to become aware of it.

Point of sale advertising can inform a customer of special sales or offers if the customer is already in the store but does not have the impact or coverage of media or print advertising.

Local or "neighborhood" businesses are often found in neighborhoods and strip malls comprising a number of small businesses sharing a common parking lot or along streets bordering residential neighborhoods. The term "neighborhood business" is intended to identify individual locations, not necessarily businesses limited to a selected amount of commercial activity. For example, franchised store locations may do a high volume of business yet are "neighborhood" because much of their business comes from customers living nearby.

It is an advantage for neighborhood businesses to provide information to their customers about other neighborhood businesses. A customer in one local store will thus see information about another local store that is nearby, perhaps in the same strip mall, that will prompt the customer to stop at that second local store to purchase something the customer otherwise may not have chosen to do. Store owners and employees also benefit from learning about the stores located near theirs, making it more likely that customers at one store will be referred to another, nearby store, benefiting the neighborhood as a whole.

One familiar type of neighborhood business is the shop that provides dry cleaning services for clothing. A typical dry cleaning shop accepts clothing, cleans or launders the clothing (often on the premises) and then hangs the clothing on racks until the customer comes to claim it. Often the clothing racks are constructed as material handling conveyors constructed to move the cleaned clothing to a pickup area within the store where it is retrieved by the store operator and given to the customer.

U.S. Pat. No. 6,823,236 (Speckhart, et al.) shows one type of material handling conveyor made up of individual links pivotally joined together with the links providing sites upon which to hang clothing and a motor and associated controls to drive the conveyor thus moving the clothing from a storage site to a pickup site. In many dry cleaning shops the pickup site is the front of the store where the customer waits while the store operator runs the conveyor to bring the customer's cleaning order to the operator who, in turn, gives the clothing to the customer. While the conveyor is running it is observable by the customer and other customers waiting to pick up or drop off their own clothing. The conveyor draws attention by its movement and the sound associated with it.

Another feature of such material handling conveyors is their ability to be constructed to accommodate the interior spaces of such shops, with the conveyor links able to travel horizontally or on an upward or downward slope and around corners as required. As an example, the conveyor may angle upward to create space below it for equipment or personnel, and may angle downward to provide a site for shop workers to hang finished orders on selected conveyor links.

There is a need to provide local businesses with a simple and inexpensive way to inform their customers about other local businesses and their services. Furthermore, there is a need to provide such information systems in forms which make it easy and inexpensive to display such information and to change the display when the information changes. Moreover, in some cases there is a need for such information systems to be applied to existing store operating equipment rather than to require dedicated, single use display devices. Additionally, there is a further need for such information systems to be applied to existing material storage and delivery systems as well as to newly manufactured such systems.

SUMMARY OF THE INVENTION

The present invention provides an information display that can be added to selected links of a material handling conveyor, one example of which is the type of conveyor found in a typical dry cleaning shop. Because such conveyors are expensive to purchase and install, and generally have a long operating life it is important for the display to be usable with an already-installed conveyor system as well as to be part of a newly-constructed system.

Allowing the information displays to be easily and quickly changed allows neighborhood businesses to notify customers of daily sales or specials with relatively little lead time required. Including local information by way of the displays can represent an income stream for the store owner or a source of goodwill by allowing local businesses and entities to place ads for free.

Accordingly, one form of the invention comprises a media holder for a dry cleaning conveyor and the dry cleaning conveyor may include a plurality of interconnected links. In some embodiments, the media holder may be attached to one of the plurality of interconnected links and the media holder includes a continuous display portion adapted to removably receive and display a media. The media holder may further include a base portion that is attached to the continuous display portion and a connector portion that is configured to attach the media holder to one of the plurality of interconnected links such that the base portion and the continuous display portion are orientated to display the media in a viewable position and allow unimpeded movement of the dry cleaning conveyor during operation.

In accordance with another aspect of the present disclosure, an apparatus for displaying an advertising or informational media on a dry cleaning conveyor is disclosed. The dry cleaning conveyor may include a multiplicity of pivotally interconnected links and the dry cleaning conveyor may be movable whereby the multiplicity of pivotally interconnected links are moveable to different locations. In some embodiments the apparatus may include a media holder that is adapted to removably hold the media. Furthermore, the media holder may include a means for mounting the media holder to one of the multiplicity of interconnected links, the media holder and the means for mounting the media holder being shaped and dimensioned to allow adjacent links of the multiplicity of interconnected links to pivot with respect to one another when the dry cleaning conveyor is moved.

In accordance with another aspect of the present disclosure, a method for displaying local advertising on a dry cleaning conveyor having a multiplicity of individual links is disclosed. In some embodiments, the method may include providing a media holder that is adapted to be attached to the multiplicity of individual links. The method may further include attaching the media holder to one of the multiplicity of individual links and inserting a selected media into the media holder. Moreover, the method may further include operating the dry cleaning conveyor to bring the media holder into the view of an observer.

BRIEF DESCRIPTION OF THE DRAWINGS

These and further aspects of the present invention can be more readily understood upon consideration of the drawings, in which:

FIG. 2 is a front elevational view of a material handling conveyor link used in a dry cleaning shop;

FIG. 3 is a top elevational view of the link in FIG. 2;

FIG. 4 is a view along 4-4 of FIG. 2;

FIG. 5 is a view along 5-5 of FIG. 2;

FIG. 6 is a front view of a conveyor assembly using links such as shown in FIG. 2;

FIG. 18 is a perspective view of an embodiment of the present invention; and

FIG. 19 is a side sectional view of the holder of FIG. 18.

It should be understood that the drawings are not necessarily to scale, and that the disclosed embodiments are illustrated diagrammatically, schematically, and in some cases in partial views. In certain instances, details which are not necessary for an understanding of the discloses methods and apparatus, or which render other details difficult to perceive, may have been omitted. It should be further understood that the following detailed description is merely exemplary and not intended to be limiting in its application or uses. As such, although the present disclosure is for purposes of explanatory convenience only depicted and described in illustrative embodiments, the disclosure may be implemented in numerous other embodiments, and within various systems and environments not shown or described herein.

DETAILED DESCRIPTION OF THE DRAWINGS

Figure 1:
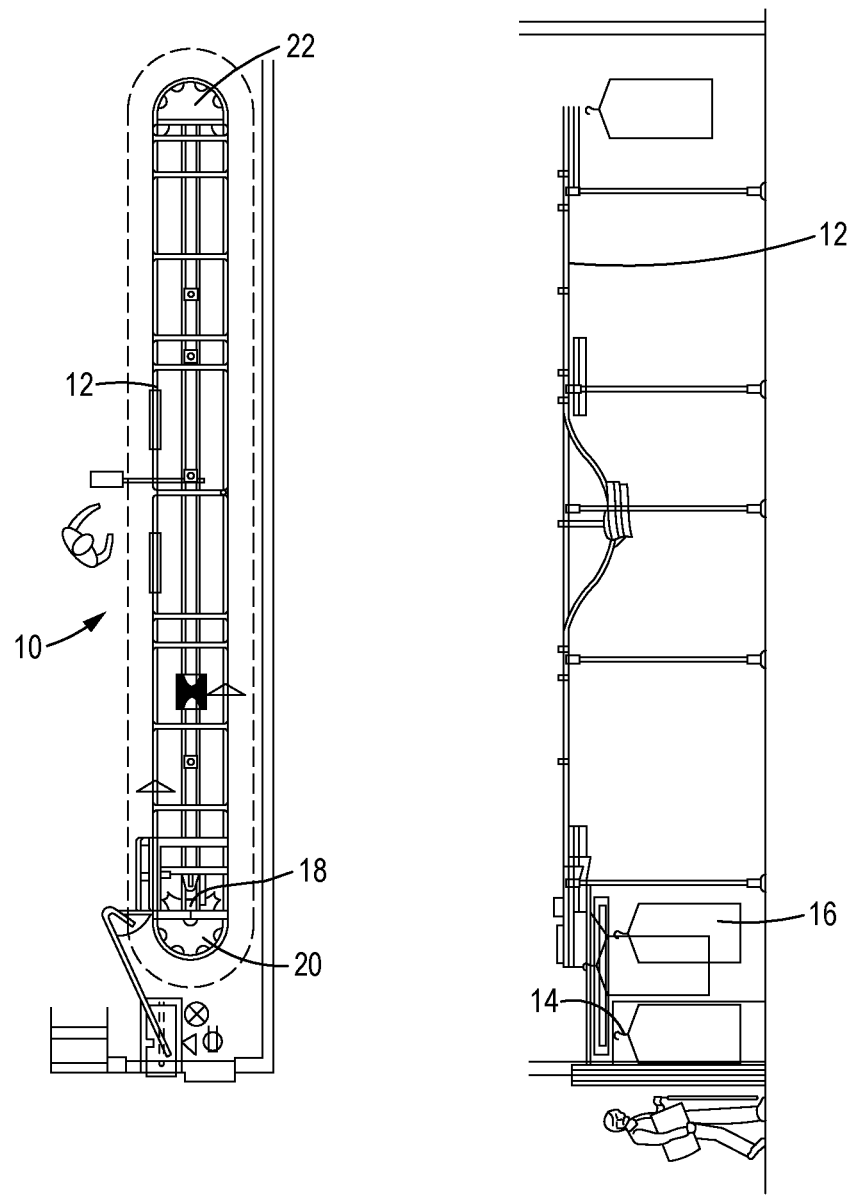
FIG. 1 is an illustration from a prior art patent illustrating the configuration of a type of material handling conveyor used in a cleaning shop.

Referring now to FIG. 1, the numeral 10 indicates generally a view of a prior art material handling conveyor intended for use in a dry cleaning shop. FIG. 1 is taken from U.S. Pat. No. 6,823,236 (Speckhart, et al.) and is intended to show the general configuration of such a conveyor but does not include the present invention.

For purposes of convenience the term "conveyor" when used herein, shall mean a material handling conveyor of the type used in dry cleaning shops, while the term "link" shall mean an individual link of the type included in such a conveyor.

While the conveyor identified by numeral 12 is of a different type of construction than that described herein, it shows a configuration of the type with which the links described herein are used. As seen in both drawings shown in FIG. 1, clothing hangers such as shown at 14 and bagged garments such as shown at 16 are suspended from a conveyor 12 which rotates responsive to the activation of a drive motor 18 which turns a drive sprocket 20. The idler sprocket 22 supports the conveyor 12 at an end distal from the drive sprocket 20.

Referring now to FIG. 2, the numeral 24 identifies an exemplary link of a conveyor, such as the conveyor 12 of the type with which an embodiment of the present invention is concerned. The link 24 comprises an upper bar 26 and a lower bar 28 joined and spaced apart by a series of ribs 30. A series of upstanding pegs 32 extend upward from the lower bar 28 toward the upper bar 26. One end of the upper bar 26 terminates at an upper pin sleeve 34, while the lower bar 28 terminates at a lower pin sleeve 36, with the sleeves 34 and 36 being aligned one with the other. At its other end, the link 24 terminates at a support rib 38 which extends from the second end of the upper bar 26 to the second end of the lower bar 28. Attached to the rib 38 is a hollow cylindrical tubular connector 40. The sleeves 34, 36 and the connector 40 are constructed to be alignable when a plurality of the links 24 are connected, as described below. The ribs 30 and the upper and lower bars 26, 28 form a series of windows 42 within which clothes hangers can be inserted and thereby suspended. The pegs 32 serve to act as separators between groups of hangers.

FIG. 3 generally shows the alignment of the sleeves 34, 36 and the positioning of the sleeve 40 relative to the sleeves 34, 36. Preferably, the link 24 and its above-described components are manufactured as a single piece, such as by molding or casting. The link shown in FIG. 2 is manufactured by White Conveyors, Inc. of Kenilworth, N.J. and is made from aluminum. FIG. 4 shows another view of the alignment of the sleeves 34, 36, while FIG. 5 shows the positioning of the connector 40 on the support rib 38.

Referring now to FIG. 6, the numeral 44 identifies a portion of a conveyor constructed using links, such as the link 24 and adjacent links 24', 24". The link 24 is mounted to a trolley rail 46 at one end by a trolley assembly 48 and at the opposite end by a trolley assembly 48'. The trolley assembly 48 has a rail guide 50 which engages the rail 46. A mounting arm 52 extends upward from the rail guide 50 and terminates at a wheel assembly 54, which is supported by the rail 46. The rail guide 50 and the wheel assembly 54 allow the trolley assembly 48 to roll along the rail 46 generally as described with respect to FIG. 1. The link 24 is attached to the trolley assembly 48 by a link pin 60 which, as shown in FIG. 6, passes through the connector 40 of the link 24 and the upper and lower sleeves 34', 36' of the adjacent link 24'.

In similar fashion, the trolley assembly 48' has an adjacent rail guide 50' which engages the rail 46. A mounting arm 52' extends upward from the rail guide 50' and terminates at a wheel assembly 54' which is supported by the rail 46. The rail guide 50' and wheel assembly 54' allow the trolley assembly 48' to roll along the rail 46 generally, as described with respect to FIG. 1.

The link 24 and the adjacent link 24" are supported by the trolley assembly 48' by the link pin 60' which, as shown in FIG. 6, passes through the upper and lower sleeves 34, 36 of the link 24, a connector 40" of adjacent link 24', and are secured to the guide 50'. FIG. 6 is illustrative of the environment in which the link 24 is used and it is important that the present invention allows the link 24 and the remaining links in the conveyor 44 to be free to pivot with respect to each other and to move along the rail 46.

Figure 7:
FIG. 7 is a front elevational view of a first embodiment of the media frame of the present invention.

Referring now to FIG. 7 and with continued reference to FIG. 6, a display assembly 62 is shown mounted to the link 24. In some embodiments, the openings or apertures 56, 58 which extend through the upper bar 26 of the link 24, as shown in FIG. 6, may be used to attach the display assembly 62 to the link 24. Media in the form of a printed advertisement or "ad card" 64 is shown inserted into the assembly 62, as will be described below. The ad card 64 is exemplary of the type of media which can be displayed by the assembly 62 and use of the term "ad card" will be used in the following descriptions, while being understood that the term "ad card" is intended to include other forms of displayable media as well.

Figure 8:
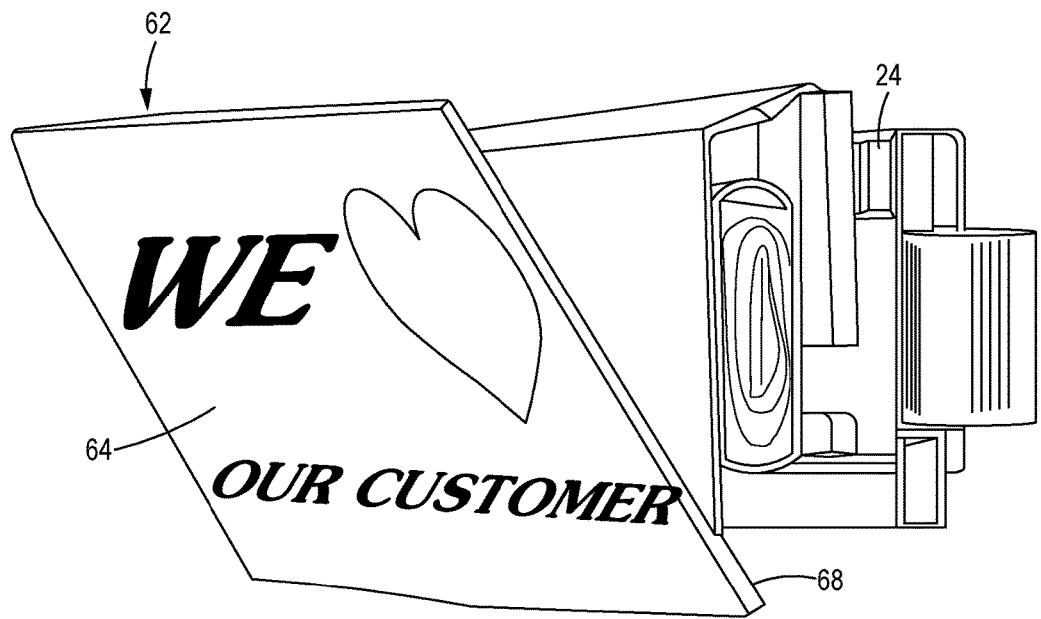
FIG. 8 is an angled front perspective view of the link and frame shown in FIG. 7.
Figure 9:
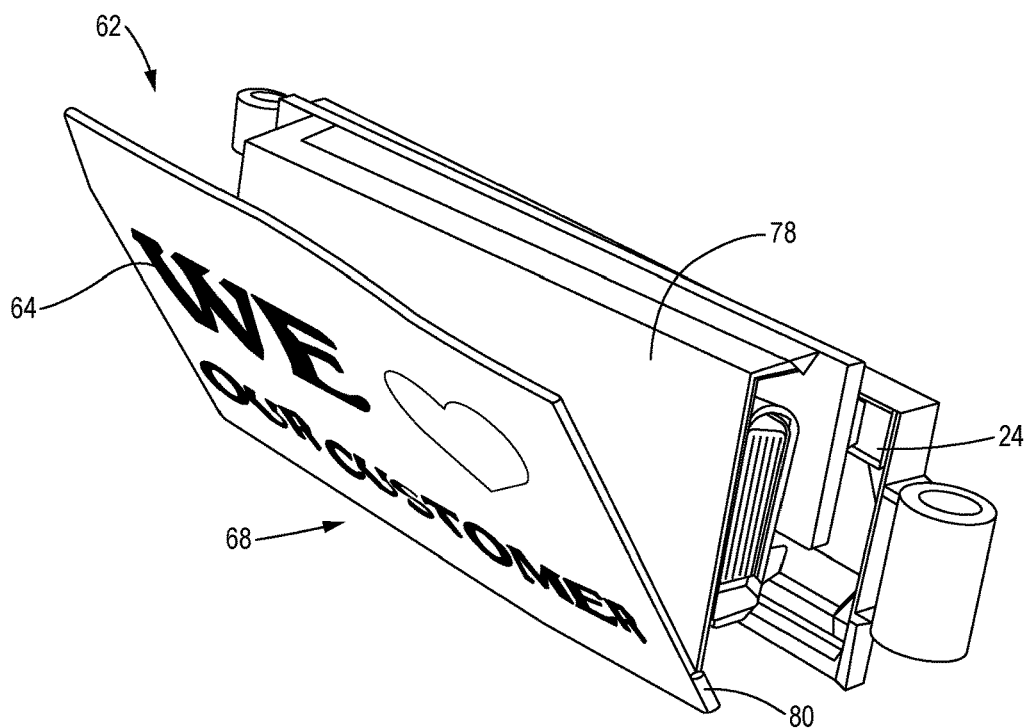
FIG. 9 is a top angled perspective view of the link and frame shown in FIG. 7.
Figure 10:
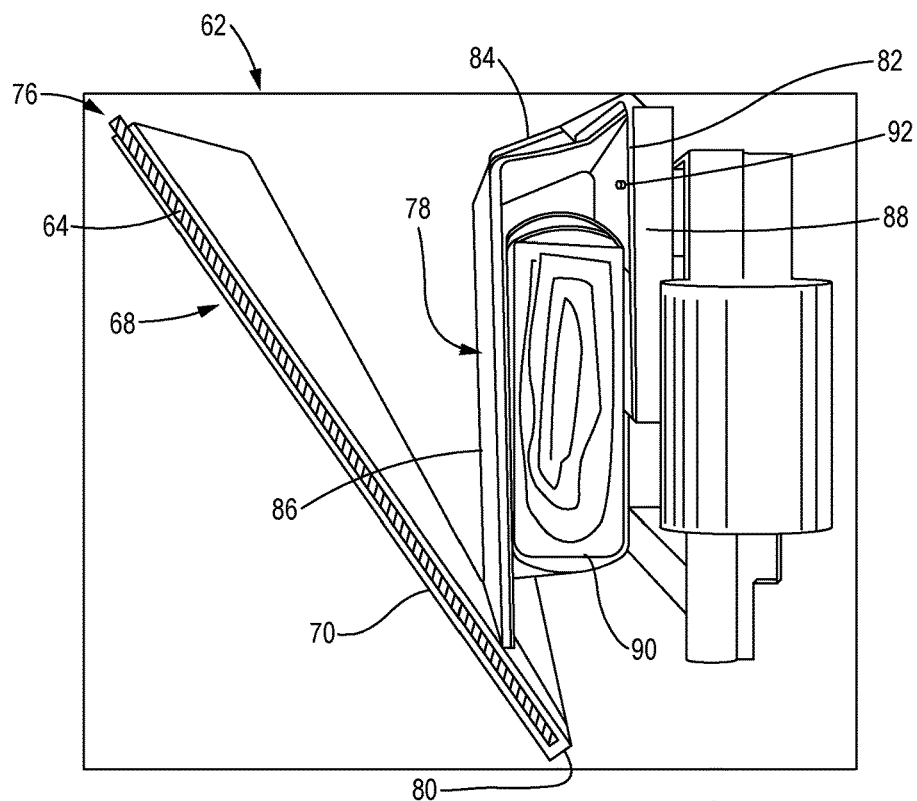
FIG. 10 is a lateral perspective view of the link and frame of FIG. 7.
Figure 11:
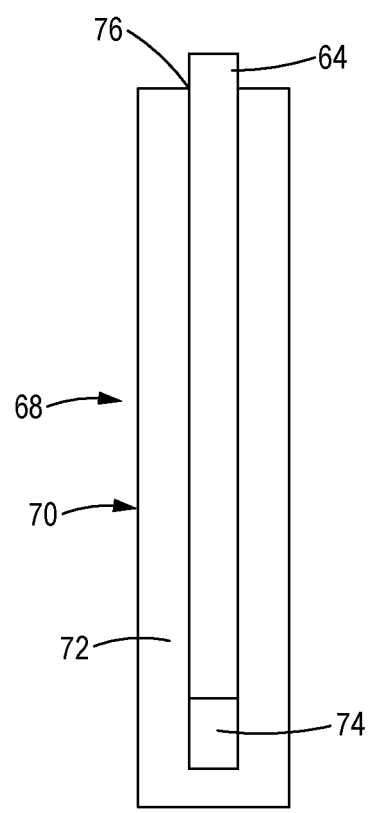
FIG. 11 is an isolated sectional view of the sleeve of FIG. 10.

Referring now to FIG. 8, the display assembly 62 is shown with the ad card 64 inserted into an ad holder 68. As best seen in FIGS. 9, 10 and 11, the ad holder 68 is preferably formed as a u-shaped rigid clear plastic sleeve 70 having a continuous wall 72 defining an ad card holder cavity 74 terminating at an open top 76 through which the ad card 64 is inserted. In this manner, the ad card 64 can easily and conveniently be changed by removing the ad card 64 from the ad holder 68 and inserting a different ad card.

Referring now to FIGS. 8 and 9, views of the display assembly 62 are shown with the ad holder 64 held at an angle with respect to the link 24. Such a display is advantageous when link 24 is positioned higher than eye level, allowing the full ad card 64 to be more easily seen.

Referring now to FIGS. 9 and 10, the ad display 62 is shown in greater detail, with the ad holder 64 attached to a support brace 78 at a support brace lower edge 80. In the embodiment shown, the support brace 78 has a back segment 82, a top segment 84 and a front segment 86 preferably formed from a single piece of material, such as a thin, bendable, adaptable, flexible metal or plastic web. In the embodiment shown, the back segment 82 is attached to a mounting plate 88 which, in turn, is attached to the link 24.

To provide support and stability to the support brace 78, a spacer 90 is inserted between front segment 86 and back segment 82 and attached securely to both. One method of attachment is the use of a cement suitable for joining the brace segments 82, 86 to the spacer 90. Similarly, FIG. 10 illustrates that the back segment 82 is attachable to the mounting plate 88 by using an appropriate cement. Alternatively, a number of threaded fasteners 92, such as but not limited to a screw, can be driven through the back segment 82 into the mounting plate 88.

Figure 12:
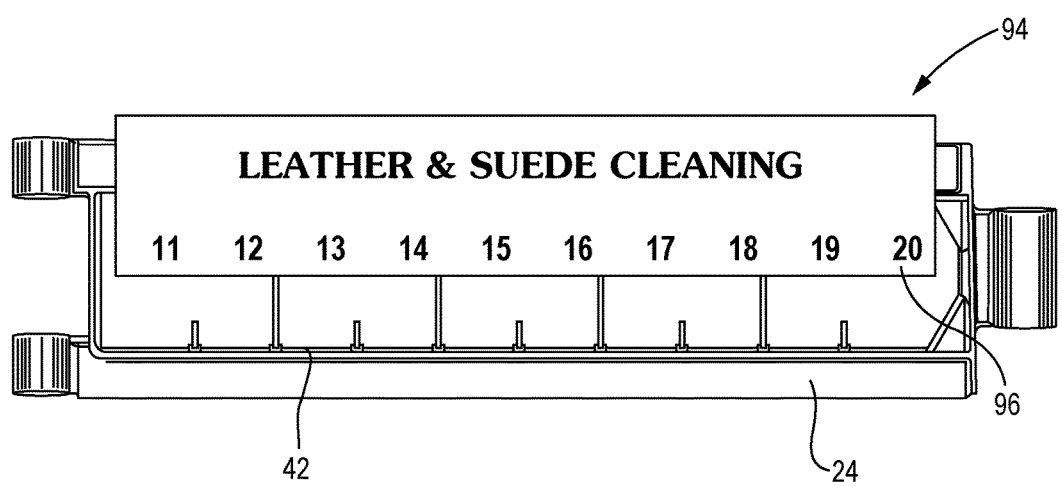
FIG. 12 is a front elevational view of a second embodiment of the present invention.

Referring now to FIG. 12, a variation of the present invention is shown. The link 24 has an ad display 94 mounted thereon, presenting a planar surface to display advertising or informational material. The ad display 94 is sized and positioned to allow access to the windows 42 so hangers can be easily suspended and removed. A numbering strip 96 is also provided if the numbering for the individual windows 42 is concealed when the ad display 94 is mounted to the link 24.

Figure 13:
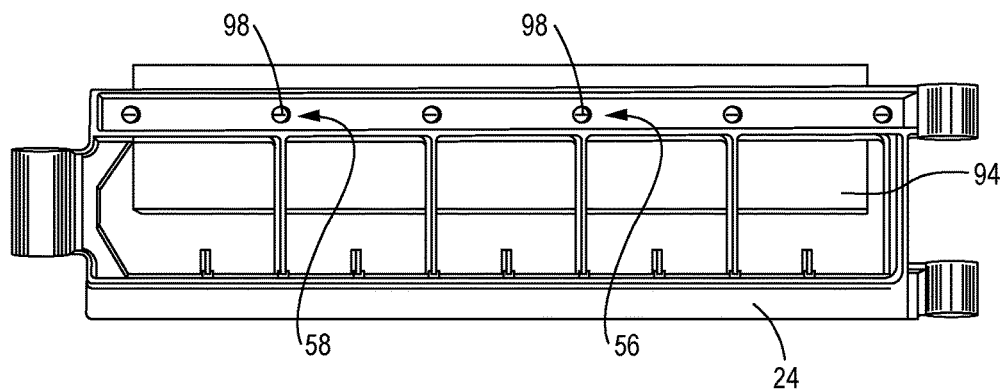
FIG. 13 is a rear elevational view of the embodiment shown in FIG. 12.

FIG. 13 is a rear view of the link 24 with the ad display 94 in place. This configuration is simple to install and use and works well when the portion of the conveyor 12 visible to a customer is positioned low enough to allow the customer to conveniently see the ad. As seen in FIG. 13, the ad display 94 can be attached to the link 24 by screws or similar fasteners 98 inserted through the apertures or openings 56, 58 of the upper bar 26.

Figure 14:
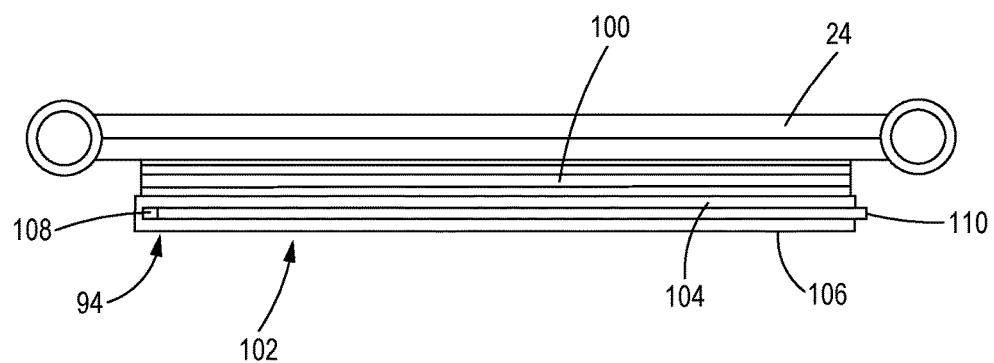
FIG. 14 is a top elevational view of the embodiment shown in FIG. 12.

Referring now to FIG. 14, the ad display 94 is shown comprising a mounting board 100 to which a clear plastic sleeve 102 is attached. The sleeve 102 has a pair of spaced apart planar sheets 104, 106 defining therebetween a cavity 108 into which the ad card 110 can be inserted. In this manner, the ad display 94 can conveniently be changed by removing the ad card 110 and inserting another ad card with different text and graphics.

Figure 15:
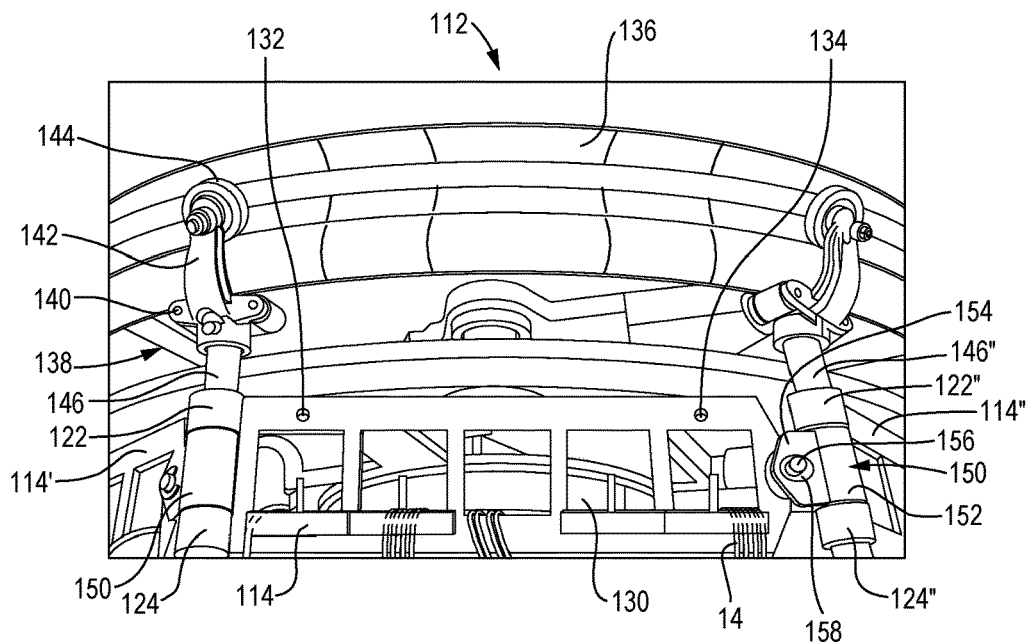
FIG. 15 is a partial front view of a material handling conveyor demonstrating a second embodiment of the present invention.

Referring now to FIG. 15, the numeral 112 indicates a second conveyor system typical of older installations. A link 114, more fully shown in FIG. 16, is commonly formed from steel and is substantially flat when compared to the aluminum link 24 of FIG. 2.

Figure 16:
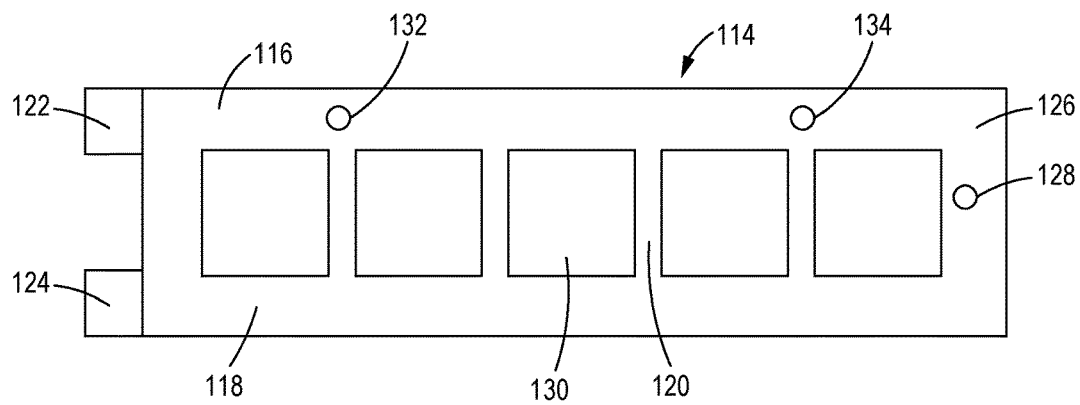
FIG. 16 is a front elevational view of a link used in the conveyor of FIG. 15.

Referring now to FIGS. 15 and 16, the link 114 is formed as a single piece and comprises an upper bar 116 and a lower bar 118 joined and spaced apart by a series of ribs 120. One end of the upper bar 116 terminates at an upper pin sleeve 122, while the lower bar 118 terminates at a lower pin sleeve 124, with the sleeves 122, 124 being aligned with each other. At its other end, the link 114 terminates at an end rib 126 which extends from the second end of the upper bar 116 to the second end of the lower bar 118. A bracket aperture 128 is formed in the end rib 126. Furthermore, the ribs 120 and the upper and lower bars 116, 118 form a series of windows 130 within which the clothes hangers 14 can be inserted and thereby suspended from and carried by the conveyor 112, as shown in FIG. 15. A pair of apertures 132 and 134 are formed in the upper bar 116.

As shown in FIG. 15, one end of the link 114 is mounted to a trolley rail 136 by a trolley assembly 138. The trolley assembly 138 has a rail guide 140 which engages the rail 136. A mounting arm 142 extends upward from the guide 140 and terminates at a wheel assembly 144 which is supported by the rail 136. The guide 140 and wheel assembly 144 allow the trolley assembly 138 to roll along the rail 136 generally as described with respect to FIG. 1.

The link 114 is attached to the trolley assembly 138 by a link pin 146 which, as shown in FIG. 15, passes through the upper and lower sleeves 122, 124 of the link 114. A link connector 150 joins the link 114 to an adjacent link 114'.

An identical link connector 150 joins link 114 to an adjacent link 114" at the opposite end. As seen in FIG. 15, the link connector 150 has a tubular portion 152 sized to fit around the link pin 146" and terminates at a pair of opposed ears 154. A bolt 156 passes through a pair of aligned apertures 158 formed in the opposed ears 154 and, when tightened, secures the connector 150 around the pin 146".

As further illustrated in FIGS. 15 and 16, the bracket aperture 128 provides a mounting point for the connector 150 to the link 114. The end rib 126 is inserted between the opposing ears 154 of the link connector 150 to align the apertures 158 with the bracket aperture 128, and allowing the bolt 156 to pass through and be secured. Furthermore, as seen in FIG. 15, when assembled, the link pin 146 is passed through the upper pin sleeve 122, the link connector 150 and the lower pin sleeve 124 to attach the link 114 to the adjacent link 114'. In similar fashion, the link 114 is attached to the adjacent link 114" by passing the link pin 146" through the upper sleeve 122", the connector 150 and the lower sleeve 124".

Figure 17:
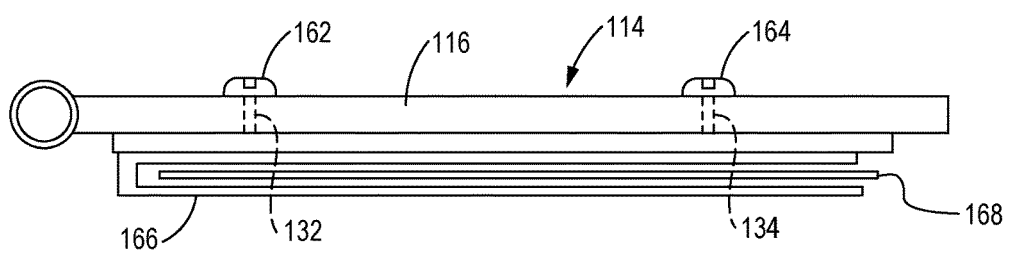
FIG. 17 is a top plan view of the link of FIG. 16.

Referring now to FIG. 17, the link 114 is shown with a mounting board 160 attached to the link 114 by the screws 162, 164 passing through the apertures 132, 134, respectively. A transparent sleeve 166 is shown affixed to the board 160 within which an ad card 168 is inserted as described hereinabove.

Referring to FIG. 18 and with continued reference to FIGS. 2-6, an additional embodiment of an ad display assembly 170, including a large ad display holder 172 and a small ad display holder 174, is illustrated. The ad display assembly 170 may include a plurality of links 24 which are joined or interconnected together, as described above. Moreover, each link of the plurality of links 24 may have a large ad display holder 172 or a small ad display holder 174 mounted thereon, presenting a planar visible surface to display, or otherwise, communicate advertising or other informational material. The large ad display holder 172 and the small ad display holder 174 may be positioned with respect to the each link of the plurality of links 24 such that the advertising or informational material is easily viewed by the targeted audience (i.e., customers).

For example, the large ad display holder 172 may be configured to display a large ad card 176 and the small ad display holder 174 may be configured to display a small ad card 178. Additionally or alternatively, the large ad card 176 may be configured to hold multiple smaller ad cards, such as but not limited to the small ad card 178. Moreover, the large ad display holder 172 and the small ad display holder 174 may be mounted on the upper bar 26 and removably attached to each link of the plurality of links 24. In one non-limiting example, the large ad display holder 172 and the small ad display holder are attached to each link of the plurality of links 24 using a fastener 180, such as but not limited to, a spring clip, a screw, an adhesive, or other such fastener.

Referring now to FIG. 19, and with continued reference to FIG. 18, a sectional view of an exemplary small ad display holder 174 is shown. While FIG. 19 illustrates the small ad display holder 174, it will be understood that the description of the small ad display holder 174 may be applicable to the large ad display holder 172 as well. In one non-limiting example, the small ad display holder 174 has a base portion 182 that extends between a connector portion 184 and a continuous display portion 186. In some embodiments, the connector portion 184 extends downward from a first end 185 of the base portion 182 and the continuous display portion 186 extends upward from a second end 187 of the base portion 182. In some embodiments the connector portion 184 and the continuous display portion are arranged to be approximately parallel to each other. Furthermore, in one embodiment, the base portion 182 and the connector portion 184 are joined at the first end 185 of the base portion 182 forming an approximately orthogonal angle. Similarly, the base portion 182 and the continuous display portion 186 are joined at the second end 187 of the base portion 182 forming an approximately orthogonal angle, however other configurations of the base portion 182, the connector portion 184, and the continuous display portion 186 are possible. Alternatively, in an embodiment, the connector portion 184 and/or the continuous display portion 186 may be connected to the base portion 182 to form a non-orthogonal angle. For example, the continuous display portion 186 may be form an acute angle or an obtuse angle with the base portion 182 such that the continuous display portion is angled away or towards the customer.

Referring back to FIG. 18, with continued reference to FIG. 19, the connector portion 184 may extend downward from the base portion 182 such that the connector portion 184 may provide support and facilitate attachment of the small ad display holder 174 to the upper bar 26 of the link 24. Furthermore, the small ad display holder 174 may be adjacently positioned along the upper bar 26 of the link 24 such that a bottom side 188 of the base portion 182 and a lateral side 190 of the connector portion 184 are in contact with the upper bar 26 of the link 24. Moreover, the fastener 180, such as a spring clip, a screw, an adhesive, or other such fastener, removably secures the connector portion 184 to the upper bar 26 such that the small ad display holder 174 is attached to the link 24.

Additionally or alternatively, in some embodiments, the base portion 182, the connector portion 184 and the continuous display portion 186 are formed from a single piece of material. In one non-limiting example, the single piece of material is bendable, adaptable and/or adjustable such that the connector portion 184 and/or the continuous display portion 186 may be adapted to form a non-orthogonal angle with the base portion 182. For example, is some embodiments, the continuous base portion may be adapted to form an acute angle or an obtuse angle with the base portion 182. Similarly, the connector portion 184 may be adapted to form an acute angle or an obtuse angle with the base portion 182.

As further shown in FIG. 19, the continuous display portion 186, of the small ad display holder 174, includes a rear display portion 192 and a front display portion 194. Moreover, in some embodiments, the continuous display portion 186, including the rear display portion 192 and the front display portion 194, defines a rigid sleeve with an ad holder or media cavity 196 formed between the rear display portion 192 and the front display portion 194. In some embodiments, the continuous display portion 186, including the rear display portion 192 and the front display portion 194 defines an adaptable or malleable sleeve with the media cavity 196 and the sleeve is adjustable. Moreover, the small ad card 178 may be inserted into the media cavity 196 and displayed by the continuous display portion 186. In one non-limiting example, the continuous display portion 186, including the rear display portion 192 and the front display portion 194 may be formed out of a transparent material so the small ad card 178 is visible to the viewer when it is inserted into the media cavity 196. Alternatively, in some embodiments, the continuous display portion 194, including the rear display portion 192 and the front display portion 194 may be formed out of an opaque material and a center portion of the front display portion 194 may be cut out such that the small ad card 178 is visible to the viewer when it is inserted into the media cavity 196. Furthermore, the media cavity 196 may be configured such that the small ad card 178, or other form of displayable media, can easily and conveniently be inserted and removed from the small ad holder display 174 as needed.

FIGS. 11-14 and 18-19 show the present invention is attachable to newer-style aluminum links either as part of an existing installation or as attachable prior to the link being assembled into a completed conveyor. FIGS. 15 through 17 show the present invention can be used to retrofit an older, existing installation without requiring disassembly of the conveyor.

The foregoing descriptions have been presented by way of example and are not intended to limit the invention. It is anticipated that other configurations are possible which, while differing from the foregoing, still fall within the spirit and scope of the invention described and claimed herein.

What is claimed is:

1. A media holder for a dry cleaning conveyor, the dry cleaning conveyor including a plurality of interconnected links and the media holder being attached to one of the plurality of interconnected links, the media holder comprising:
    a continuous display portion adapted to removably receive and display a media;
    a base portion attached to the continuous display portion; and
    a connector portion configured to attach the media holder to one of the plurality of interconnected links such that the base portion and the continuous display portion are orientated to display the media in a viewable position and allow for unimpeded movement of the dry cleaning conveyor during operation.

2. The media holder of claim 1, wherein the continuous display portion further comprising a front display portion and a rear display portion arranged to define a media cavity, the media cavity being disposed between the front display portion and the rear display portion and configured to allow for insertion and removal of the media.

3. The media holder of claim 1, wherein the continuous display portion being formed from a transparent material such that the media is visible through the continuous display portion.

4. The media holder of claim 1, wherein the base portion extends horizontally between a first end and a second end and the continuous display portion extends upwardly from the second end of the base portion such that the continuous display portion being orthogonal to the base portion.

5. The media holder of claim 4, wherein the base portion, the connector portion and the continuous display portion comprising a single piece of adaptable material, and the continuous display portion is adjustable such that an angle between the base portion and the continuous display portion being non-orthogonal.

6. The media holder of claim 4, wherein the connector portion extends downwardly from the first end of the base portion and the connector portion being orthogonal to the base portion.

7. The media holder of claim 6, wherein the connector portion attaches to an upper bar of one of the plurality of inter connected links, the base portion extends horizontally away from the plurality of interconnected links to allow adjacent links of the plurality of interconnected links to pivot with respect to one another as the dry cleaning conveyor operates.

8. The media holder of claim 1, wherein the media comprises a card.

9. An apparatus for displaying an advertising or informational media on a dry cleaning conveyor, the dry cleaning conveyor comprising a multiplicity of pivotally interconnected links, the dry cleaning conveyor being movable whereby the multiplicity of pivotally interconnected links are moveable to different locations, the apparatus comprising:
    a media holder, the media holder adapted to removably hold the media; and
    a means for mounting the media holder to one of the multiplicity of interconnected links, the media holder and the means for mounting the media holder being shaped and dimensioned to allow adjacent links of the multiplicity of links to pivot with respect to one another when the dry cleaning conveyor is moved.

10. The apparatus as recited in claim 9, wherein the means for mounting the media holder further comprises a mounting plate being attached to one of the multiplicity of pivotally interconnected links.

11. The apparatus as recited in claim 9, wherein the media holder comprises a transparent sleeve, the transparent sleeve comprising a pair of opposed walls, spaced apart a sufficient distance to define a cavity and the cavity being sized and shaped to allow for insertion and removal of the media.

12. The apparatus as recited in claim 9, wherein mounting the media holder further comprises a brace having a first brace portion and a second brace portion, the first brace portion being formed at an angle with respect to the second brace portion, the first brace portion being attached to one of the multiplicity of interconnected links, and the media holder being attached to the second brace portion whereby the media holder is positioned at an angle to one of the multiplicity of interconnected links.

13. The apparatus as recited in claim 12, wherein the means for mounting the media holder further comprises a pad interposed between and attached to the first brace portion and the second brace portion.

14. The apparatus as recited in claim 9 wherein the media comprises a card.

15. A method for displaying local advertising on a dry cleaning conveyor, the dry cleaning conveyor having a multiplicity of individual links, the method comprising the steps of:
    providing a media holder adapted to be attached to the multiplicity of individual links;
    attaching the media holder to one of the multiplicity of individual links;
    inserting a selected media into the media holder; and
    operating the dry cleaning conveyor to bring the media holder into the view of an observer.

16. The method of claim 15, wherein attaching the media holder further comprises attaching a mounting plate to one of the multiplicity of individual links.

17. The method of claim 15, wherein attaching the media holder further comprises a brace having a first brace portion and a second brace portion, the first brace portion being configured to form an angle with respect to the second brace portion, attaching the first brace portion to one of the multiplicity of individual links, and attaching the media holder to the second brace portion, whereby the media holder is positioned at an angle to one of the multiplicity of individual links.

18. The method of claim 17, wherein attaching the media holder further comprises interposing a pad between the first brace portion and the second brace portion and attaching the pad to the first brace portion and the second brace portion.

19. The method of claim 15, wherein the media holder further comprises providing a transparent sleeve, the transparent sleeve including a pair of opposed walls, the opposed walls spaced apart a sufficient distance and configured to define a cavity, and the cavity being sized and shaped to allow for insertion and removal of the media.

20. The method of claim 15, wherein the media comprise a card.

\* \* \* \* \*